(12) United States Patent
Dayalan et al.

(10) Patent No.: US 12,475,890 B1
(45) Date of Patent: Nov. 18, 2025

(54) VOICE-BASED INTERACTIONS WITH A GRAPHICAL USER INTERFACE

(71) Applicant: Amazon Technologies, Inc., Seattle, WA (US)

(72) Inventors: Senthil Kumar Dayalan, Chennai (IN); Manikandan Thangarathnam, Chennai (IN); Sai Vinayak, Chennai (IN); Suraj Gopalakrishnan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 18/543,946

(22) Filed: Dec. 18, 2023

Related U.S. Application Data

(63) Continuation of application No. 16/903,698, filed on Jun. 17, 2020, now Pat. No. 11,887,589.

(51) Int. Cl.
| | |
|---|---|
| *G10L 15/22* | (2006.01) |
| *G06F 3/0482* | (2013.01) |
| *G06F 3/16* | (2006.01) |
| *G10L 15/06* | (2013.01) |
| *G10L 15/18* | (2013.01) |
| *G10L 15/26* | (2006.01) |

(52) U.S. Cl.
CPC ............ *G10L 15/22* (2013.01); *G06F 3/0482* (2013.01); *G06F 3/167* (2013.01); *G10L 15/063* (2013.01); *G10L 15/1815* (2013.01); *G10L 15/26* (2013.01); *G10L 2015/0638* (2013.01); *G10L 2015/223* (2013.01)

(58) Field of Classification Search
CPC ... G10L 15/22; G10L 15/063; G10L 15/1815; G10L 15/26; G10L 2015/0638; G10L 2015/223; G06F 3/0482; G06F 3/167
See application file for complete search history.

(56) References Cited

U.S. PATENT DOCUMENTS

| | | | |
|---|---|---|---|
| 6,570,588 B1 * | 5/2003 | Ando | G06F 3/0481 715/728 |
| 10,978,046 B2 * | 4/2021 | Huang | G10L 15/22 |

(Continued)

OTHER PUBLICATIONS

U.S. Appl. No. 16/903,698, "Final Office Action," mailed Mar. 31, 2023, 40 pages.

(Continued)

*Primary Examiner* — Michael Colucci
(74) *Attorney, Agent, or Firm* — KILPATRICK TOWNSEND & STOCKTON LLP

(57) ABSTRACT

Techniques for voice-based interactions are described. In an example, a device presents a user interface on a display. The device starts an operational mode of the device. The operational mode restricts voice-based interactions with the user interface to a set of commands. The set of commands is defined in a language model that is stored on the device. Further, the device receives, at a microphone of the device, audio data corresponding to a natural language utterance and generates, from the audio data, text data that corresponds to the natural language utterance. The device determines, based at least in part on the language model, that semantics of the text data correspond to a command from the set of commands and presents, on the display, an outcome of performing the command.

20 Claims, 10 Drawing Sheets

(56) References Cited

U.S. PATENT DOCUMENTS

| | | | | |
|---|---|---|---|---|
| 11,112,944 B1* | 9/2021 | Simon | | G06F 3/0482 |
| 2002/0010585 A1* | 1/2002 | Gachie | | H04M 7/006 |
| | | | | 704/270.1 |
| 2007/0100633 A1* | 5/2007 | Ramirez | | G10L 17/26 |
| | | | | 704/275 |
| 2007/0133769 A1* | 6/2007 | Da Palma | | H04M 15/06 |
| | | | | 379/142.1 |
| 2011/0054899 A1* | 3/2011 | Phillips | | G10L 15/30 |
| | | | | 704/235 |
| 2013/0316769 A1* | 11/2013 | Kim | | H04W 52/0225 |
| | | | | 455/574 |
| 2014/0245202 A1* | 8/2014 | Yoon | | G06F 3/0482 |
| | | | | 715/765 |
| 2015/0186359 A1* | 7/2015 | Fructuoso | | G10L 25/30 |
| | | | | 704/8 |
| 2016/0133254 A1* | 5/2016 | Vogel | | G06F 16/24578 |
| | | | | 704/275 |
| 2016/0217790 A1* | 7/2016 | Sharifi | | G10L 15/01 |
| 2017/0110125 A1* | 4/2017 | Xu | | G10L 15/22 |
| 2017/0116987 A1* | 4/2017 | Kang | | G10L 15/26 |
| 2017/0242657 A1* | 8/2017 | Jarvis | | G10L 17/22 |
| 2018/0136738 A1* | 5/2018 | Argiro | | G06F 3/0227 |
| 2018/0247645 A1* | 8/2018 | Li | | G10L 15/22 |
| 2018/0307303 A1* | 10/2018 | Powderly | | G06F 3/017 |
| 2018/0335939 A1* | 11/2018 | Karunamuni | | G06F 9/445 |
| 2019/0115010 A1* | 4/2019 | Yu | | G06F 40/58 |
| 2019/0115029 A1* | 4/2019 | Kracun | | G10L 15/08 |
| 2019/0362557 A1* | 11/2019 | Lacey | | G06T 5/20 |
| 2020/0227034 A1* | 7/2020 | Summa | | G10L 15/22 |
| 2020/0286467 A1* | 9/2020 | Chao | | G10L 15/183 |
| 2021/0125611 A1* | 4/2021 | Yu | | G10L 15/197 |
| 2021/0249004 A1* | 8/2021 | Smith | | G10L 15/22 |

OTHER PUBLICATIONS

U.S. Appl. No. 16/903,698, "Non-Final Office Action," mailed May 9, 2022, 25 pages.
U.S. Appl. No. 16/903,698, "Non-Final Office Action," mailed Oct. 21, 2022, 34 pages.
U.S. Appl. No. 16/903,698, "Notice of Allowance," mailed Sep. 20, 2023, 14 pages.
U.S. Appl. No. 16/903,698, "Supplemental Notice of Allowability," mailed Dec. 7, 2023, 12 pages.

* cited by examiner

User 130

Computing Device 110
Menu 122
Display 120

"Alexa, open browse mode" 132
User 130

Browse Mode Indicator 112
Computing Device 110
Menu 122
Display 120

"Scroll down" 134
User 130

Command Indicator 114
Computing Device 110
Menu 122
Display 120

"Exit browse mode" 136
User 130

Computing Device 110
Menu 122
Display 120

VOICE-BASED INTERACTIONS WITH A GRAPHICAL USER INTERFACE

CROSS-REFERENCE TO RELATED APPLICATIONS

This application is a continuation claiming priority to and the benefit of U.S. application Ser. No. 16/903,698, filed on Jun. 17, 2020, and titled "VOICE-BASED INTERACTIONS WITH A GRAPHICAL USER INTERFACE," the contents of which are herein incorporated in their entirety for all purposes.

BACKGROUND

As voice recognition technology improves, systems that employ such technology continue to proliferate. Some systems employ what is referred to as near-field voice recognition where a user speaks into a microphone located on a handheld device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for voice-based interactions with other devices.

BRIEF DESCRIPTION OF THE DRAWINGS

Various embodiments in accordance with the present disclosure will be described with reference to the drawings, in which.

DETAILED DESCRIPTION

Figure 1:
FIG. 1 illustrates an example of voice-based interactions with a computing device communicatively coupled with a display, according to at least one embodiment.
Figure 1:
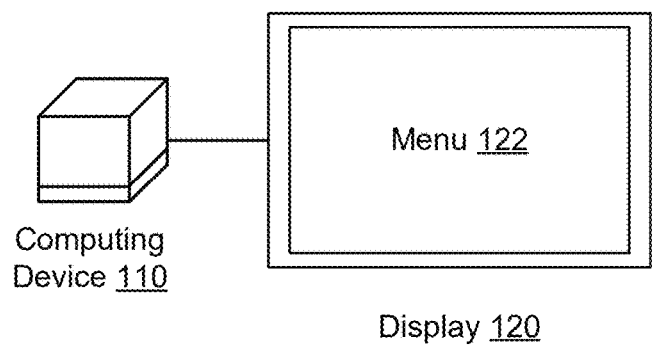
Figure 1:
Figure 1:
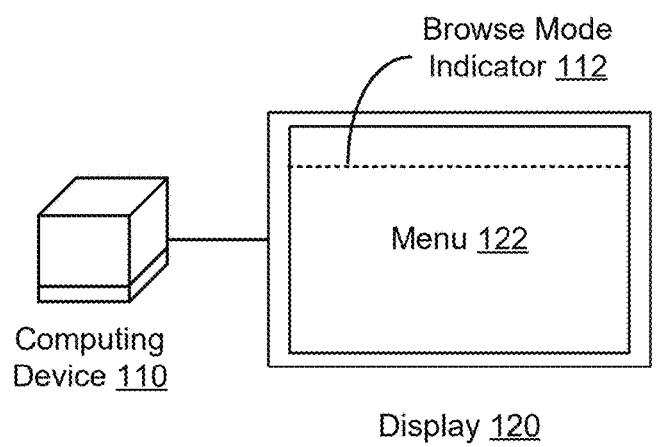
Figure 1:
Figure 1:
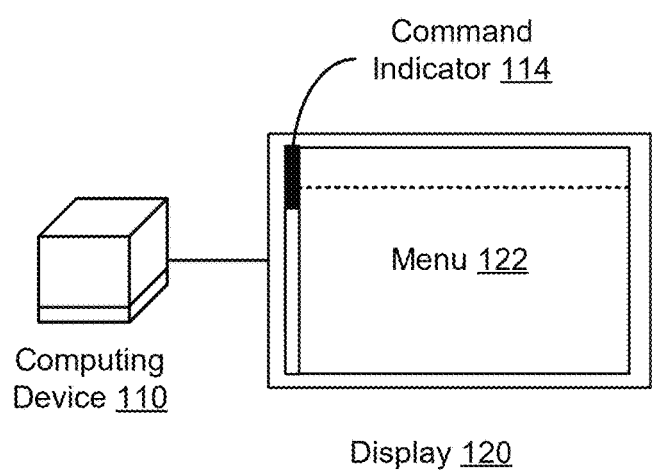
Figure 1:
Figure 1:
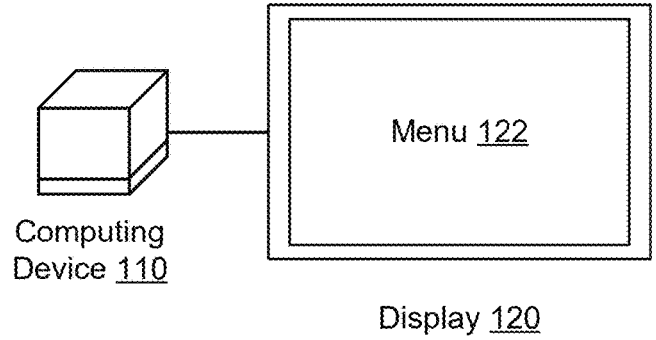

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order to not obscure the embodiment being described.

Embodiments of the present disclosure are directed to, among other things, improving voice-based interactions with a GUI via a computing device. In an example, the computing device is communicatively coupled with the display and presents a menu in the GUI. Upon a trigger, the computing device starts a particular operational mode in which voice-based interactions are restricted to a set of commands and need not include a wakeword. Specifically, the computing device continues locally processing audio data that is received at a microphone of the computing device while being in the operational mode, where the audio data corresponds to one or more natural language utterances that do not include the wakeword. The local processing involves a language model that is implemented on the computing device and is configured to determine whether the audio data corresponds to any command from the set of commands. If so, the command is performed and an outcome of the performance is presented in the GUI. Otherwise, a notification is presented indicating that a requested command is not supported and/or requesting a confirmation whether the operational mode is to be stopped, and/or the audio data is sent to a server set for further processing.

In an illustrative example, consider the use case of a smart streaming media player, such as the Amazon Cube® available from AMAZON, a corporation headquartered in Seattle, Washington, U.S.A. The smart streaming media player is connected to a television and is configured to present pages organized in a menu for streaming audio, downloading and launching applications, and browsing the Internet, among other things. Rather than relying on a remote control to navigate the menu and select an action, voice-based interactions can be used. In particular, a first user utterance is received by the smart streaming media player and requests the smart streaming media player to start a browse mode (e.g., "Alexa, start browse mode"). The smart streaming media player detects the wakeword (e.g., "Alexa") and sends at least a portion of the received audio data (e.g., "start browse mode") to a natural language processing (NLP) system hosted on a cloud computing platform. In response, the smart streaming media player receives an instruction to start the browse mode. In this browse mode, the smart streaming media player continues to receive and locally process audio data that does not include the wakeword to determine whether the audio data corresponds to any command for controlling the menu (e.g., navigating the menu or launching an action available from the menu). Specifically, if a pause is detected for more than a predetermined time period (e.g., thirty seconds), the smart streaming media player stops the browse mode. Otherwise, a language model executing on the smart streaming media player translates the audio data into text data and determines the semantics of the text data. If the semantics match a command to navigate within a page that is in view (e.g., scroll up, scroll down), a command to navigate to a different page (e.g., go to home page, go to settings), or a command for an action available from the page (e.g., play a trailer, rent a movie), the smart streaming media player performs the command. Otherwise, the smart streaming media player presents an indication that a requested command is not supported and requests whether the browse mode is to be stopped. For instance, when the audio data is processed to "scroll down," the page is scrolled down. When the audio data is processed to "what is the weather today," a notification is presented that says, "your request is not supported; would you like to exit the browse mode?" In this way, a user can control the menu without having to repeat the wakeword in each utterance. The menu controls are also very responsive because the audio data is locally processed, thereby reducing transmission and processing latency associated with sending instead the audio data to the cloud computing platform and receiving and processing a response therefrom. Accordingly, the voice-based interactions can replace the use of the remote control while providing a similar, if not an improved, user experience.

Embodiments of the present disclosure provide various technological improvements over existing systems that support voice-based interactions. As explained in connection with the above example of a smart streaming media player, GUI intuitiveness is improved by avoiding the need to repeat the use of a wakeword. In addition, GUI responsiveness is improved by locally processing the audio data. Further, the GUI intuitiveness and responsiveness enable replacement of a remote input device or peripheral, such as a remote control, that would be otherwise needed for a similar user experience.

FIG. 1 illustrates an example of voice-based interactions with a computing device 110 communicatively coupled with a display 120, according to at least one embodiment. In an example, the computing device 110 supports an operational mode, where the voice-based interactions need not use a wakeword for at least a predetermined time period (e.g., thirty seconds) and are restricted to a set of commands (e.g., commands to control a menu 122 presented on the display 120). While in the operational mode, the computing device 110 uses a language model, implemented on the computing device 110 as further described in FIG. 2, to process audio data that is received as part of the voice-based interactions. The language model is configured to support specific functionalities that correspond to the restricted set of commands.

In the interest of clarity of explanation, the operational mode is described herein as "browse mode." In the browse mode, the voice-based interactions are restricted to browsing the menu, where the browsing includes navigation within and between portions (e.g., pages) of the menu and requesting actions available from the menu. In other words, the browse mode corresponds to browse functionalities of a peripheral device (e.g., a remote control) that browse the menu, where the browse functionalities are enabled via natural language utterances that need not use a wakeword rather than button pushes or user inputs at the peripheral device. Whereas the computing device 110 supports many other functionalities (e.g., controlling Internet of Things (IoT) devices, accessing various user accounts, communicating with other devices such as for voice calls), the computing device 110's functionalities are restricted in the browse mode to the browse functionalities.

In an example, a user 130 operates the computing device 110. The computing device 110 presents the menu 122 on the display 120 for the user. The menu 122 shows functionalities of the computing device 110, some of which can be only interacted with when presented on the display 120. For instance, computing device 110 is a smart streaming media player and the menu 122 presents audio streaming functionalities for streaming an audio file (e.g., music) from a remote content source and playing the audio via the speakers of the display 120, video streaming functionalities for streaming a video file (e.g., a movie) from a remote content source and presenting the video file on the display 120, and/or application download and launch for downloading an application (e.g., a game, a news service) from an application store to the computing device 110 and executing the application to present content (e.g., video game content, news content) via the speakers and/or on the display 120. In this and other illustrations, the menu 122 may organize the functionalities in different pages (e.g., a page for audio streaming, a page for video streaming, a page for application download, a page for a particular video file upon a selection of the video file from the video streaming page, a home page showing links to the different pages, a settings page to review and edit settings of the computing device 110).

The computing device 110 can be a user device suitable for supporting voice-based interactions with the user and presenting the menu 122 and other content on the display 120. In the illustration above, the computing device 110 is a smart streaming media player. Other user device types are also possible, such as a smart microphone, a smart speaker capable of sensing natural language utterances, an IoT device capable of sensing natural language utterances, or another user device that has natural language utterance sensing capability and that is capable of being communicatively coupled with the display 120, and where the processing of the audio data corresponding to a natural language utterance can be triggered upon a detection of the wakeword (e.g., "Alexa"). Generally, any of such user devices includes a microphone, a processor, and a non-transitory computer-readable medium (e.g., a memory) communicatively coupled with each other, and one or more network interfaces (e.g., wireless and/or wired) coupled with the processor and connectable to the display and with a remote server set (e.g., a cloud computing platform). In an example, the non-transitory computer-readable medium stores a language model such as a program code (e.g., a set of computer-readable instructions) executable by the processor and configured to process audio data generated by the microphone. In another example, the language model is implemented as hardware, or as software executing on dedicated hardware, and is coupled with the processor, the microphone, and/or the network interface.

As illustrated, a first natural language utterance 132 (shown as "Alexa, open browse mode") is detected by the computing device 110, such as by the microphone of the computing device 110 that generates audio data therefrom. The audio data is processed, resulting in a determination that the audio data is a trigger for the browse mode. As illustrated in the next figures, this processing can be distributed between the computing device 110 and the server set (not shown in FIG. 1). Further, other triggers are possible. For instance, a predictive trigger can be used, whereby a pattern of the interactions of the user 130 with the menu 122 (including voice-based interactions or interactions via a peripheral device, such as a remote control) and/or a pattern of interactions performed after a selection of a particular action available from the menu 122 can be detected and, upon identification, trigger the browse mode. In another illustration, a particular input and the peripheral device can be used as a trigger for the browse mode.

The computing device 110 starts the browse mode and indicates that the browse mode has been started and is ongoing by presenting a browse mode indicator 112 on the display 120. The browse mode indicator 112 can be a line with a particular color (e.g., blue) across the display and can be updated, upon audio data being generated by the microphone, to show a waveform indicating that a natural language utterance is being detected. Of course, other types of the browse mode indicator 112 are possible, including, for instance, presenting a microphone icon on the display 120. Additionally or alternatively, a browse mode indicator 112 can be output from other output interfaces, including, for instance, emitting a light (e.g., a blue light) from light emitting diodes (LEDs) of the computing device 110 and/or playing a chime from a speaker of the computing device 110 and/or a speaker of the display 120.

Next, a second natural language utterance 134 (shown as "scroll down") is detected by the computing device 110, such as by the microphone that generates audio data therefrom. Because the computing device 110 is in the browse mode, the computing device 110 continuously processes audio data generated by the microphone (e.g., an audio channel is established between the microphone and the processor, and the microphone continuously sends the audio data to the processor for audio processing according to the language model). The processing can be performed at least in part by the language model. And the natural language utterance 134 need not include the wakeword (e.g., "Alexa"). For instance, text data is generated from the audio data, and the language model performs natural language understanding (NLU) on the text data to determine semantics of the text data and determine whether the semantics match one of the commands available in the browse mode. In the illustration of FIG. 1, the "scroll down" is matched to a command for scrolling the menu 122 down. The computing device 110 performs this command (e.g., scroll the menu 122 down) and presents an outcome of performing the command. This outcome can be presented with a command indicator 114 that indicates the determined command, such as by showing a scroll down bar or an arrow down in the illustrative example of a scroll down command. However, if the language model could not determine a match to any of the commands available in the browse mode, the command indicator 114 can be replaced with an indicator that the natural language utterance 134 does not correspond to an available command (e.g., a hint text is displayed at the bottom of the menu 122 notifying the user 130, "your request is not possible in the browse mode"), with a request to confirm whether the browse mode is to be stopped (e.g., a confirmation text is displayed at the bottom of the menu 122 asking the user 130, "would you like to stop the browse mode"), and/or by sending the audio data to the server set and receiving a set of instructions in a response from the server set.

The voice-based interactions of the user 130 with the computing device 110 can be repeated and do not need to use the wakeword as long as the computing device 110 remains in the browse mode. For instance, the user 130 can request via natural language utterances to scroll left, open a page, play a trailer, rent a movie, go to the home page, go to the settings page, etc. without having to repeat the wakeword. Each of such natural language utterances is detected by the microphone, resulting in separate audio data that is further processed locally on the computing device 110 to determine, perform, and indicate the corresponding browse command.

Subsequently, another natural language utterance 136 (shown as "exit browse mode") is detected by the computing device 110, such as by the microphone that generates audio data therefrom. The audio data is processed locally, and the computing device 110 determines that a command to exit the browse mode is received. Accordingly, the computing device stops the browse mode and stops the presentation of the browse mode indicator 112. At this point, the computing device 110 returns to its regular operational mode, where its full set of functionalities becomes available, any of which can be requested via a subsequent natural language utterance that uses the wakeword.

Although the above illustration of FIG. 1 describes using a natural language utterance that explicitly requests the stopping of the browse mode, other ways to stop the browse mode are possible. In an example, the browse mode is associated with a time period of a particular length (e.g., thirty seconds). Upon starting the browse mode, the computing device 110 also starts a timer. If the audio received is processed as including a pause longer than the time length (e.g., the timer expired before detecting a natural language utterance), the browse mode is stopped. The timer can be reset after an end of a natural language utterance and a start of a pause. In another example, an input can be received from the peripheral device (e.g., a button push on a remote control). Receiving a peripheral device's input can be used as a trigger to stop the browse mode. In yet another example, a command received while in the browse mode can trigger the performance of an action (e.g., the streaming of a movie). In this case, the browse mode is automatically stopped and the action is performed.

Further, the browse mode and related settings can be associated with a user profile of the user 130 and/or device settings of the computing device 110. For instance, a setting can be defined to enable the use of the browse mode on the computing device 110 and can be changed any time to disable it. Additionally, the length of the time period associated with the browse mode can be defined based on user input (e.g., thirty seconds, twenty seconds, or some other value). Further, a language (e.g., English, Spanish) can be stored as a user preference and can be used in the audio processing (e.g., the text data generation and semantics understanding can be adapted to the language).

Figure 2:
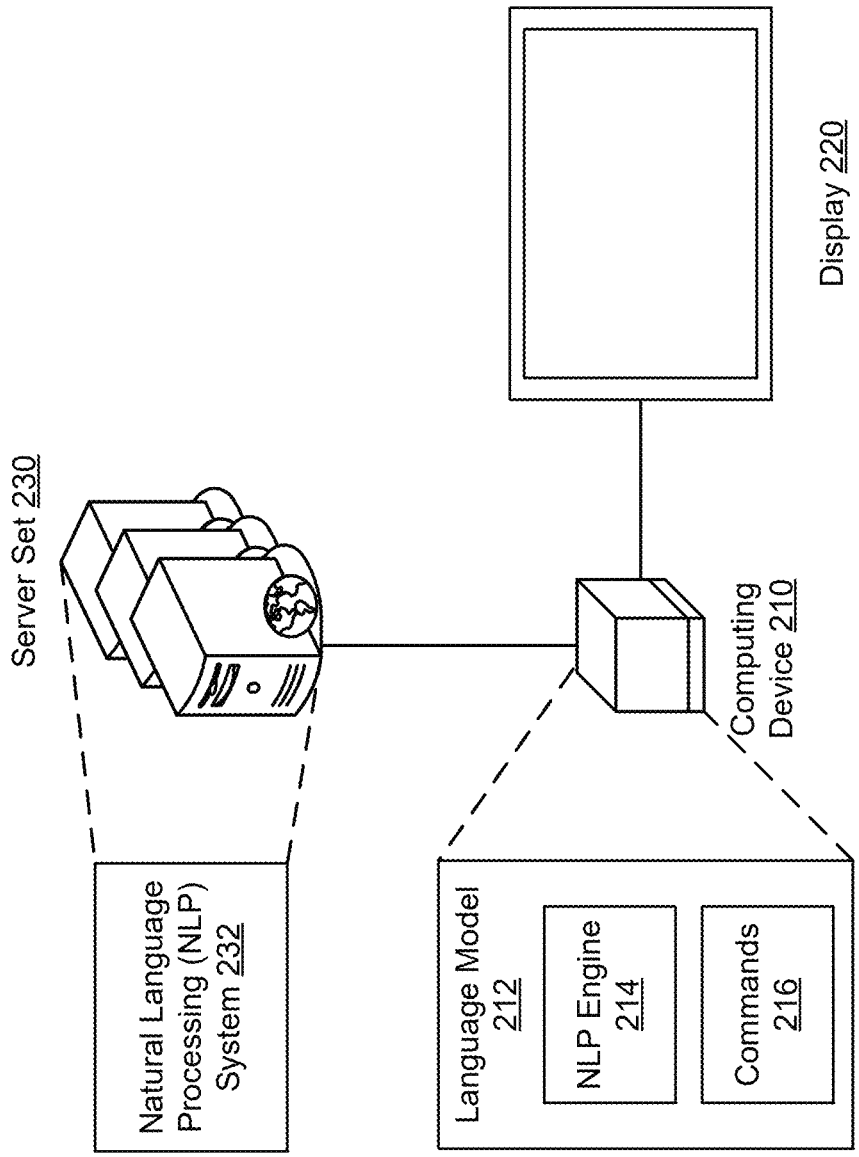
FIG. 2 illustrates an example of a system that includes a computing device, a display, and a server set to support voice-based interactions with the computing device to control a graphical user interface (GUI) on the display, according to at least one embodiment.

FIG. 2 illustrates an example of a system that includes a computing device 210, a display 220, and a server set 230 to support voice-based interactions with the computing device 110 to control a GUI on the display 220, according to at least one embodiment. The computing device 210 and the display 220 are examples of the computing device 110 and the display 120, respectively, of FIG. 1. The computing device 210 can be communicatively coupled with the server set 230 over one or more data networks, including a public network such as the Internet. Communications between the computing device 210 and the server set 230 can occur via the one or more networks to support functionalities of the computing device 210 when the computing device 210 is not in a browse mode and to trigger the browse mode.

In an example, the computing device 210 includes a language model 212. The language model 212 processes audio data generated by a microphone of the computing device 210. When not in the browse mode, the language model 212 can detect a wakeword from a portion of audio data (e.g., corresponding to "Alexa, start browse mode") and send the audio data or a remaining portion thereof (e.g., corresponding to "start browse mode") to the server set 230.

When in the browse mode, the language model 212 processes the full audio data (e.g., corresponding to "scroll down"), even when no wakeword is represented in the audio data, to determine semantics of a user utterance and match, as application, the semantics to a command available in the browse mode. In particular, the language model 212 includes an NLP engine 214 for processing the audio data and a set of commands 216 defined for the browse mode.

The NLP engine 214 is configured to perform an automatic speech recognition (ASR) process on audio data to generate text data therefrom, to perform an NLU process on the text data to determine the semantics therefrom, and to compare and match (e.g., classify) the semantics within any of the commands 216 or determine a mismatch (e.g., no match exists or the semantics cannot be classified as one of the commands 216). In an example, the NLP engine is implemented as an artificial intelligence (AI) model, such as a classifier or a neural network that is trained offline on ASR and NLU for the given set of commands 216 (e.g., the NLP engine 214 is included in the language model 212 as an instance or a trained AI model). The training can be performed across different languages (e.g., English, Spanish) such that the same NLP engine 214 can be used for the processing of audio data corresponding to user utterances in any of the languages. Alternatively, different instances of the NLP engine 214 can be trained, each one for a different language, and these instances can be included in the language model 212. In this case, the language model 212 can select the proper instance given a language setting (e.g., in a user profile or a device setting). Or, the language model 212 can include another AI model trained to detect the spoken language from a current user utterance and/or a history of recent user utterances (e.g., the last set of user utterances received in a time period, such as the last minute) to then select the proper instance of the NLP engine 214.

The set of commands 216 can correspond to different browse functionalities available in the browse mode. For instance, the set of commands 216 can include in-page navigation commands to navigate within a page of a menu presented on the display 220 (e.g., scroll down, scroll up). The set of commands 216 can also include out-page navigation commands to navigate away from a page that is in view on the display 220 to a different page that is not in view (e.g., go to settings page, go to home page). Further, the set of commands 216 can also include action commands to select one or more actions available on the page that is in view (e.g., play trailer, rent movie). Generally, the in-page and out-page navigation commands are static and do not change as navigation occurs within a page or between pages. In comparison, the action commands can be dynamically updated to only include any action(s) that is (are) in view or available for selection from the page that is in view. In this way, the language model 212 can dynamically restrict the action commands to only the one(s) that is (are) viewed or available in a viewed page.

Accordingly, when not in the browse mode, upon detecting a user utterance that includes the wakeword, the computing device 210 sends audio data to the server set 230 for further processing. When in the browse mode, the NLP engine 214 and the set of commands 216 are used to determine a match with a command of the browse mode, and if no match is found, the audio data can be sent to the server set 230.

In an example, the server set 230 represents a computer system that includes a number of servers configured as a cloud computing platform. The cloud computing platform supports various functionalities of the computing device 210 and other computing devices. In particular, the cloud computing platform includes an NLP system 232 that performs an ASR process and an NLU process on audio data received from the computing device 210 and, as applicable depending on the outcome of the processes, sends instructions back to the computing device 210 and/or other computing devices. For instance, if the audio data is processed as requesting the browse mode, the response instructs the computing device 110 to start the browse mode. If the audio data is processed as requesting a communication (e.g., a phone call) with another computing device, the computing device 110 and the other computing device are instructed to establish a communication session. Of course, other functionalities are similarly supported. Other systems can also be included in the server set 230 (e.g., the cloud computing platform) such as a communications system that establishes communication sessions between devices, and/or interfaces (including tokenization and application programming interfaces) to communicate computing services between computing devices across the same or different networks, platforms, and/or user accounts. An example of the cloud computing platform is Amazon Alexa®, available from AMAZON, a corporation headquartered in Seattle, Washington, U.S.A.

Figure 3:
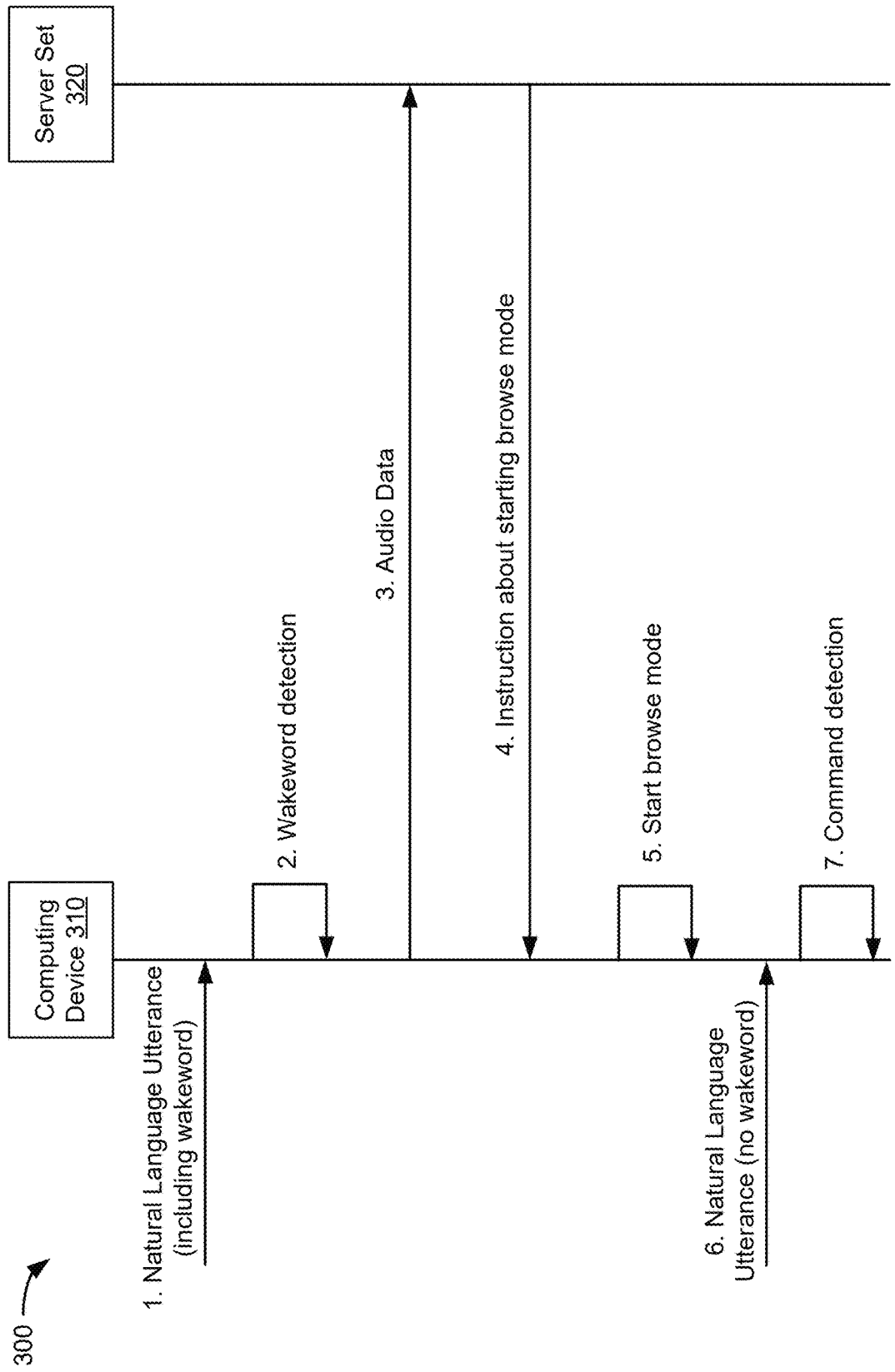
FIG. 3 illustrates an example of a sequence diagram between a computing device and a server set to support voice-based interactions with the computing device, according to at least one embodiment.

FIG. 3 illustrates an example of a sequence diagram 300 between a computing device 310 and a server set 320 to support voice-based interactions with the computing device, according to at least one embodiment. The computing device 310 and the server set 320 are examples of the computing device 210 and the server set 230, respectively, of FIG. 2. Generally, the computing device 310 and the server set 320 can exchange communications when the computing device 310 is not in a browse mode and to trigger the browse mode. In comparison, when the computing device 310 is in the browse mode, the computing device 310 can locally process audio data and need not communicate with the server set 320 to support the processing, with the exception that the audio data can be sent to the server set 320 when the local processing results in no match with any browse commands.

As illustrated, in a first step of the sequence diagram 300, the computing device 310 receives a natural language utterance of a user. For example, a microphone of the computing device 310 detects the natural language utterance and generates audio data. The natural language utterance includes a wakeword followed by a user request (e.g., "Alexa, start the browse mode"). The audio data corresponds to the wakeword and the user request.

In a second step of the sequence diagram 300, the computing device 310 performs wakeword detection on the audio data. For example, the audio data is input to a language model (e.g., the language model 212 of FIG. 2) and this language model is trained to detect the wakeword.

In a third step of the sequence diagram 300, the computing device 310, upon detection of the wakeword and not being in the browse mode, sends to the server set 320 the audio data (or at least the portion corresponding to the user request). That is the case because the computing device 310 is not in the browse mode and further processing of the audio data is to be performed at the server set 320, until the computing device 310 is in the browse mode.

In a fourth step of the sequence diagram 300, the server set 320 sends an instruction to the computing device about starting the browse mode. For example, the server set 320 performs ASR and NLU operations on the audio data and determines that an intent of the user is to enter the browse mode and then sends the instruction as a directive to the computing device 310.

In a fifth step of the sequence diagram 300, the computing device starts the browse mode. For example, the computing device 310 starts buffering audio data generated by the microphone (including data corresponding to natural language utterances, pauses, and noises) for ASR and NLU processing by an NLP engine (e.g., the NLP engine 214 of FIG. 2), starts a timer indicating lengths of time of pauses or noises, and presents an indicator of the browse mode (e.g., the browse mode indicator 112 of FIG. 1) on a display.

In a sixth step of the sequence diagram 300, the computing device 310 receives another natural language utterance. For example, the microphone of the computing device 310 detects this natural language utterance and generates corresponding audio data. Here, because the browse mode has started, the natural language utterance need not include the wakeword for the audio data to be processed locally on the computing device 310.

In a seventh step of the sequence diagram 300, the computing device 310 processes locally the audio data generated at the sixth step to determine a command, as applicable. Because the computing device 310 is in the browse command, the wakeword detection need not be performed. Instead, the computing device 310, for example, performs an ASR process on audio data as it is being received to generate text data, resets timer indicating a detection of a pause or noise, and performs an NLU process on text data upon detection of the pause or noise. The text data can be compared to browse commands (e.g., based on word matching, semantics matching, and/or classification). If a browse command is identified, the browse command can be performed, and indication about this performance of the browse command can be presented on the display (e.g., the command indicator 114 of FIG. 1). If no browse command is determined, the computing device 310 can present a notification that the user request is not supported in the browse mode and request for a user confirmation of whether to stop the browse mode, and/or stop the browse mode and send the audio data to the server set 320 for further processing thereat and for receiving a new instruction therefrom.

The sequence diagram 300 can include other steps to support the browse functionalities described in the present disclosure. For example, additional steps similar to the sixth and seventh steps can be performed to process additional natural language utterances.

Figure 4:
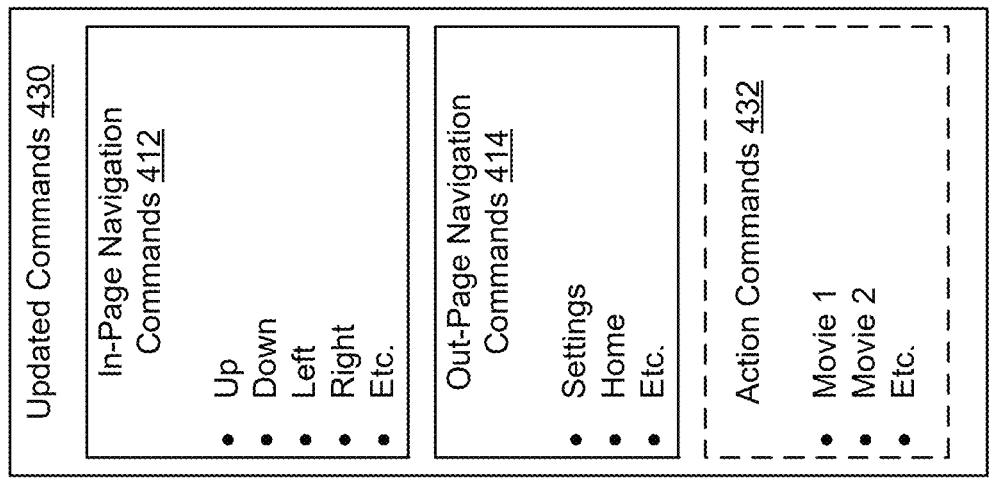
FIG. 4 illustrates an example of a dynamic update to a set of commands available from a language model that supports voice-based interactions with a computing device, according to at least one embodiment.
Figure 4:
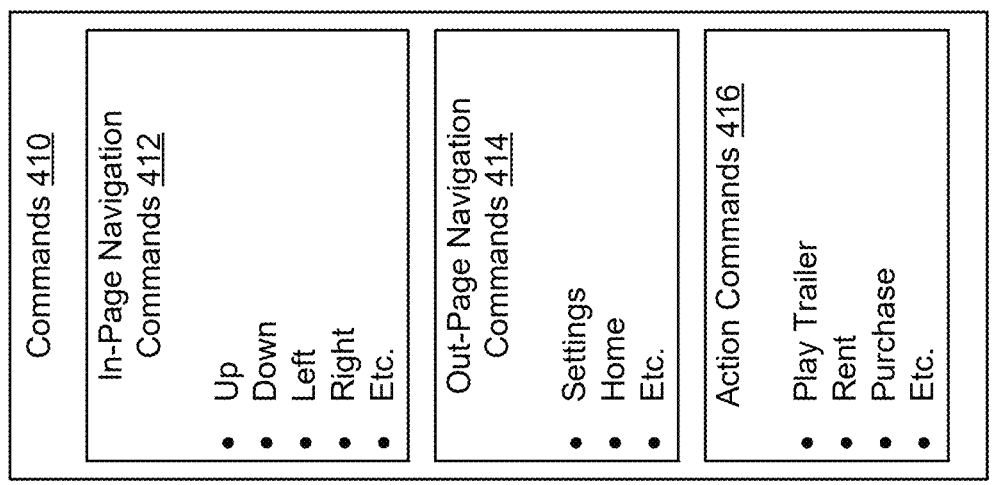

FIG. 4 illustrates an example of a dynamic update to a set of commands available from a language model that supports voice-based interactions with a computing device, according to at least one embodiment. Generally, the set of commands is defined for a browse mode to control a GUI presented on a display (e.g., to interact with a menu presented in the GUI). In an example, the set of commands includes a subset that is static and that does not change depending on the content that is in view on the GUI (e.g., a presented page from the menu). The set of commands also includes another subset that can be dynamically updated depending on the content that is in view.

In an example, a menu includes multiple pages. A page is presented (i.e., is in view) and is specific to a movie title (e.g., a movie title page that includes information about the movie title and selectable actions related to the movie title, such as to play a trailer, rent, or purchase the movie title). The page can be navigated up, down, left, and right (e.g., via scrolling) to view the information (e.g., description, release data, actors, director, producer, viewer reviews) and the selectable actions. Other pages can be navigated to, such as a settings page, a home page, or a movie streaming page.

While in the browse mode, and while the movie title page is in view, commands 410 are available. The commands 410 include in-page navigation commands 412 to navigate within the movie title page (e.g., scroll up, down, left, right). The commands 410 also include out-page navigation commands 414 to navigate to a subset of the other pages of the menu (e.g., go to settings page, go to home page). Further, the commands 410 include action commands 416 to select one of the available actions (e.g., play trailer, rent, purchase).

While in the browse mode, and upon a page change 420, another page is presented (i.e., becomes in view) and includes information about different movie titles (e.g., a movie streaming page that arranges movie titles in tiles and ribbons, each of which can be selected to present the corresponding movie title page). For this page, the in-page navigation commands 412 and the out-page navigation commands 414 remain available. However, because the content of the page is different (e.g., by including movie title actions, each associated with a movie title and selectable to present a corresponding movie title page), the action commands 416 available for the previous page are no longer applicable. Instead, action commands 432 are now available and correspond to the selectable action from the movie streaming page (e.g., a first action to select a first movie title and present the corresponding movie title page, a second action to select a second movie title and present the corresponding title page). Accordingly, updated commands 430 are associated with the movie streaming page and include the in-page navigation commands 412, the out-page navigation commands 414, and the action commands 432 (illustrated with a dashed box to indicate the dynamic change).

Accordingly, a language model that supports the browse mode stores definitions for the different commands and their associations with the pages of the menu. The in-page navigation commands 412 and the out-page navigation commands 414 are associated with the different pages of the menu. In comparison, action commands are divided into sets, and each set is associated with one of the pages that includes the corresponding actions.

Figure 5:
FIG. 5 illustrates an example of predictive voice-based interactions with a computing device communicatively coupled with a display, according to at least one embodiment.
Figure 5:
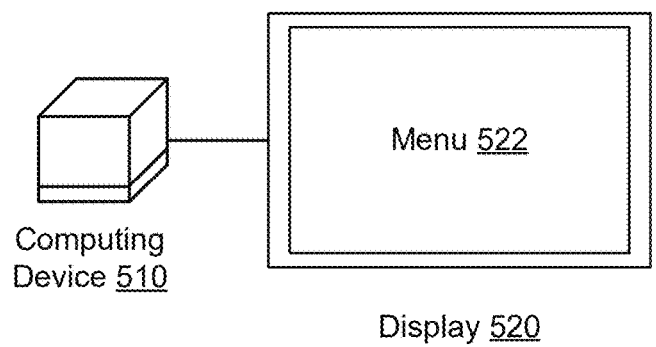
Figure 5:
Figure 5:
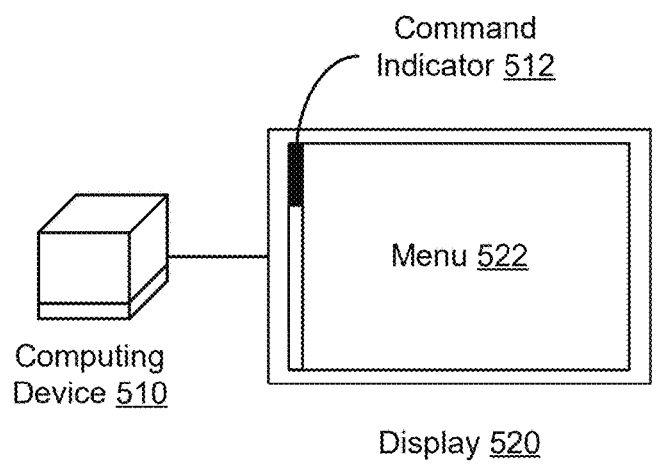
Figure 5:
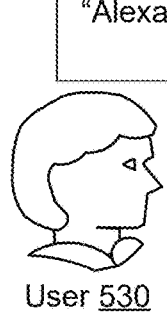
Figure 5:
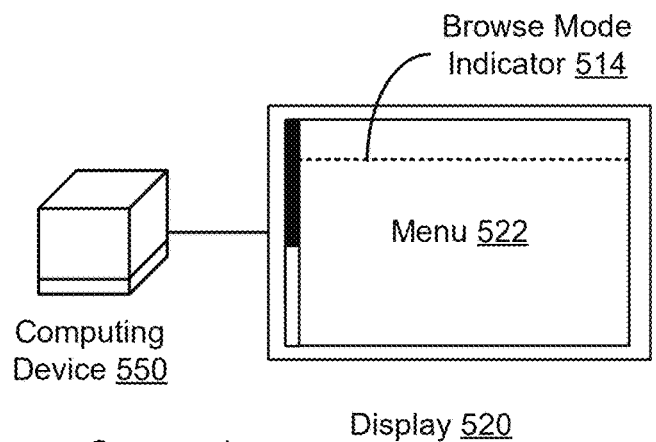
Figure 5:
Figure 5:
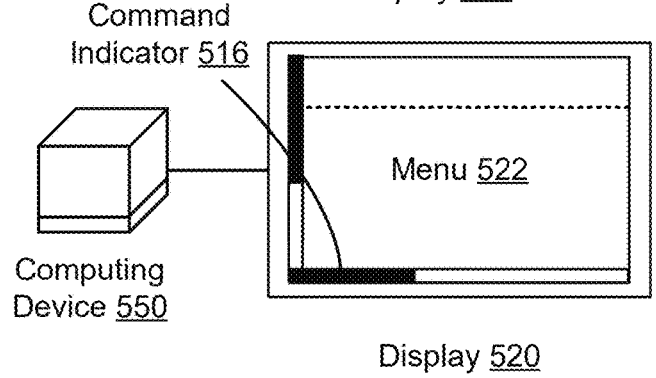

FIG. 5 illustrates an example of predictive voice-based interactions with a computing device 510 communicatively coupled with a display 520, according to at least one embodiment. The computing device 510 and the display 520 are examples of the computing device 110 and the display 120, respectively, of FIG. 1. Whereas a natural language utterance is described in connection with FIG. 1 as a trigger to start the browse mode, here a predictive trigger is used instead. In particular, various factors can be monitored to predictively start the browse mode without an explicit natural language utterance of a user 530 of the computing device 510 requesting so. One set of factors relates to the user interactions (voice-based and/or via a peripheral device), including the number and timing of these user interactions. Another set of factors relates to a specific action that is selected and an expectation that another action is likely to be selected next, and this likely selection necessitates another user interaction. Such factors and their processing are further described in the next figures.

In an example, the computing device 510 is not in the browse mode and presents a menu 522 on the display 520. Next, a first natural language utterance 532 (shown as "Alexa, scroll down") is detected by a microphone of the computing device 510 and includes the wakeword (e.g., "Alexa") and a first requested navigation command (e.g., "scroll down"). The microphone of the computing device 510 generates audio data that corresponds to the wakeword and the first requested navigation command. The computing device 510 detects the wakeword and sends the audio data (or at least the portion corresponding to the first requested navigation command) to a server set for further processing thereat (including ASR and NLU operations). The computing device 510 receives an instruction from the server set to perform the first requested navigation command (e.g., a scroll down instruction). Accordingly, the computing device 510 performs the first requested navigation command (e.g., scrolls the menu 522 down) and presents an indicator of performing the first requested navigation command (e.g., a command indicator 512 similar to the command indicator 114 of FIG. 1).

Within a few seconds later, a second natural language utterance 534 (also shown as "Alexa, scroll down") is detected and includes the wakeword and a second requested navigation command (in this illustration, another scroll down). The natural language utterance 534 is similarly processed as the first natural language utterance 532 to perform the second requested navigation command and presents the applicable indicator.

Based on the number of the processed natural language utterances (e.g., two in the above illustration), their timing (e.g., a few seconds from each other), and their association to a same functionality of the computing device 510 (e.g., navigation), the server set predicts that yet another natural language utterance is likely to be received shortly and likely relates to the navigation. Based on this prediction, the server set sends an instruction to the computing device 510 to start the browse mode. Alternatively, the prediction can be performed locally on the computing device 510.

Accordingly, the computing device 510 starts the browse mode and presents an indicator of the browse mode (e.g., a browse mode indicator 514 similar to the browse mode indicator 112 of FIG. 1). Thereafter, another natural language utterance 536 ("scroll left") is detected, does not include the wakeword, and includes a third requested command (a scroll to the left). Because the device is in the browse mode, the corresponding audio data is processed locally at the computing device 510 to determine a match between the third requested command and one of the browse commands available in the browse mode. If a match is detected, the computing device performs the matched browse command (e.g., scrolls the menu 522 to the left) and presents the relevant command indicator 516 (e.g., similar to the command indicator 114 of FIG. 1). If no match is determined, the computing device 510 can present a notification that the requested command is not supported and/or a confirmation whether to stop the browse mode, and/or send the audio data to the server set for further processing thereat.

In the above illustration, the processing of three natural language utterances is described. However, a different number of natural language utterances can be similarly processed. In particular, the predictive trigger can be determined when a pattern is detected, and this pattern can necessitate the analysis of more than two natural language utterances depending on their timing and their associations with one or more functionalities of the computing device 510. Similarly, when in the browse mode, the computing device 510 can process more than one natural language utterance before stopping the browse mode.

In addition, the predictive trigger can involve action commands in addition to or instead of navigation commands. For instance, upon a requested action command to rent a movie title, a prediction is made that an action command to start streaming the movie is likely to be made next. Similarly, upon a requested action command to download an application, a prediction is made that an action command to launch the downloaded application is likely to be made next. Based on any of these predictions, the browse mode can be started.

Generally, the predictive trigger is available only if it has been enabled. In particular, a user preference in a user profile or a device setting in a device profile of the computing device 550 can be set to enable the predictive trigger and can be disabled at any point in time by a user (e.g., the user 530) with proper access privileges.

Although the predictive trigger is described in FIG. 5 in connection with the browse mode, the predictive trigger can also be used in connection with other operational modes of the computing device 550. For instance, the computing device 510 can support a follow-up mode in which a natural language utterance that is detected within a predetermined time period and that does not include the wakeword can be further processed to identify a command, and the command need not be restricted to a particular functionality (e.g., browsing a menu) of the computing device 510 but can relate to more or all of the functionalities that the computing device 510 supports. In other words, the browse mode is one example of the follow-up mode. In particular, the browse mode allows the processing of a natural language utterance that does not include the wakeword and that is received during a time period relatively longer than that of the follow-up mode, necessitates the processing of the corresponding audio data to be locally performed at the computing device 510, and restricts functionalities to browsing a menu (e.g., to browse commands). In comparison, the follow-up mode allows the processing of a natural language utterance that does not include the wakeword and that is received during a time period relatively shorter than that of the browse mode, allows the processing of the corresponding audio data to be locally performed at the computing device 510 or remotely at the server set, and may not restrict the supported functionalities. An example of using the follow-up mode includes a set or sequence of selectable actions, where the selection of one of these actions can trigger the follow-up mode for use in connection with remaining ones of the selectable actions. For instance, a first selectable action is presented (e.g., to download an application to the computing device 510). Upon selection of this first selectable action (e.g., via a first voice-based interaction that uses the wakeword, such as "Alexa, download the application"), the follow-up mode is started. A second selectable action (e.g., to launch the application upon completion of the download) can be selected and performed via a second voice-based interaction that does not use the wakeword (e.g. "open the application"). This example is provided for illustrative purposes and the follow-up mode is not limited as such. Instead, the follow-up mode may be enabled for voice-based interactions that do not use the wakeword and that relate to any aspects of interfacing with or controlling functionalities of the computing device 510 and/or of services available via the computing device 510. In the interest of clarity of explanation, predictive triggers are described herein in connection with the browse mode. However, the embodiments of the present disclosure are not limited as such. Instead, the predictive triggers similarly apply to other operational modes, including the follow-up mode.

Figure 6:
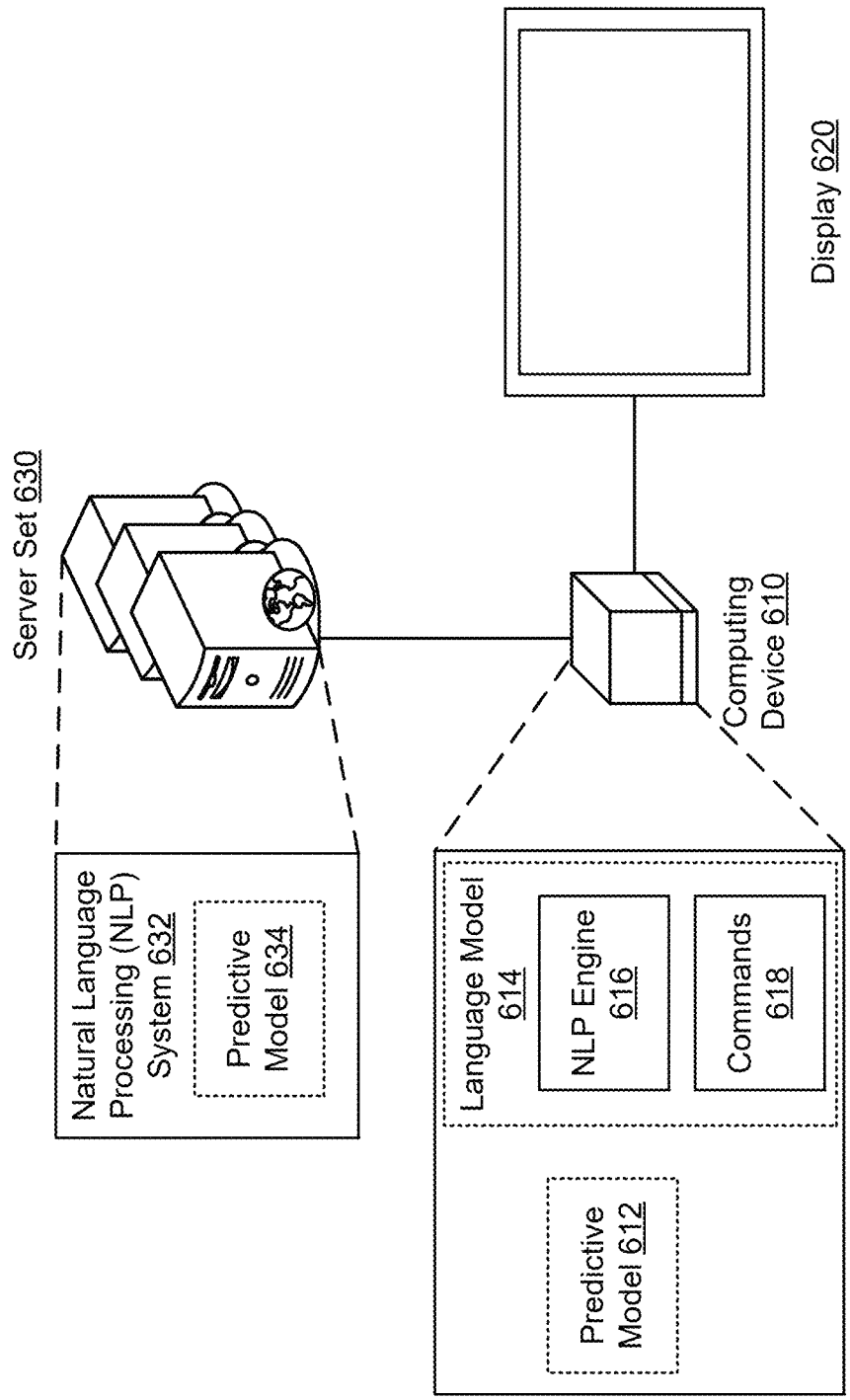
FIG. 6 illustrates an example of a system that includes a computing device, a display, and a server set to support predictive voice-based interactions with the computing device to control a GUI on the display, according to at least one embodiment.

FIG. 6 illustrates an example of a system that includes a computing device 610, a display 620, and a server set 630 to support predictive voice-based interactions with the computing device 610 to control a GUI on the display 620, according to at least one embodiment. The computing device 610 and the display 620 are examples of the computing device 510 and the display 520, respectively, of FIG. 5. The computing device 610 can be communicatively coupled with the server set 630. In this case, the computing device 610 and the server set 630 are also examples of the computing device 210 and the server set 230, respectively, of FIG. 2. In particular, the computing device 610 can include a language model 614 that implements an NLP engine 616 and stores definitions for commands 618 of a browse mode, similar to the language model 212 of FIG. 2. In FIG. 6, the language model 614 is illustrated with a dotted line to indicate that, when the computing device 610 supports a follow-up mode or some other operational mode but not the browse mode, the language model 614 need not be included in the computing device 610. Further, the server set 630 can be a cloud computing platform that includes an NLP system 632, similar to the NLP system 232 of FIG. 2.

In addition, the computing device 610 can include a predictive model 612 and, similarly, the server set can include a predictive model 634. The predictive model 612 and the predictive model 634 provide similar functionalities, such as detecting a predictive trigger to start a browse mode (or, similarly, a follow-up mode). The predictive model 612 and the predictive model 634 are each illustrated with a dotted line to indicate that the use of both predictive models 612 and 614 is not necessary. For example, the server set 630 can include the predictive model 634, whereas the computing device 610 need not include the predictive model 612. In this example, the predictive trigger is remotely detected at the server set 630 and the relevant instruction is sent from the server set 630 to the computing device 610. In another example, the computing device 610 includes the predictive model 612, whereas the server set 630 need not include the predictive model 634. In this example, the predictive trigger is locally detected at the computing device 610.

Herein next, only aspects of the predictive model 634 are described in the interest of brevity. However, these aspects equivalently apply to the predictive model 612.

In an example, historical data is collected from multiple computing devices about user interactions (including a history of interactions via peripheral devices and a history of voice-based interactions). These user interactions correspond to navigation commands, action commands, and other types of commands requested by users to interact with content presented on displays via their respective computing devices. The user interactions can also correspond to interactions with selectable actions available from one or more user interfaces. A statistical analysis can be performed on such historical data to identify patterns. A pattern may indicate that, after a sequence of commands is received within a time period, a next set of commands can be expected with a certain likelihood to occur within a time period. When the likelihood exceeds a predefined threshold value (e.g., ninety percent) and when this time period is shorter than a length of a time period of the browse mode (e.g., if a user utterance is expected to be received within twenty seconds, whereas the browse mode is enabled for thirty seconds), the pattern can be defined as an if statement and the next set of commands can be used to define a then statement (e.g., if command one, command two, etc. are observed within five seconds, then start browse mode (or similarly, start a follow-up mode)). Such if-then statements can be coded in the predictive model 634 (e.g., the predictive model 634 is an if-then model). In operation, input into the predictive model 634 are values to the variables of the if statements, where the values correspond to text data and/or requested commands.

In another example, the historical data can be used as training data to train an AI model to detect predictive triggers and start the browse mode (similarly, to start the follow-up mode). For instance, the AI model can be implemented as a deep learning neural network that learns patterns, sets weights of hidden layers, and outputs a prediction of whether the browse mode is to be started (or, similarly, of whether the follow-up mode is to be started), such as whether at least one user utterance (e.g., voice-based interaction) is expected to be received within a time period that is shorter than a length of a time period of the browse mode. In this case, the predictive model 634 is a trained AI model. In operation, input to the predictive model 634 can be features (e.g., data vectors) corresponding to a history of voice-based interactions of a user of the computing device 610, selectable actions from a user interface, text data, and/or requested commands.

Figure 7:
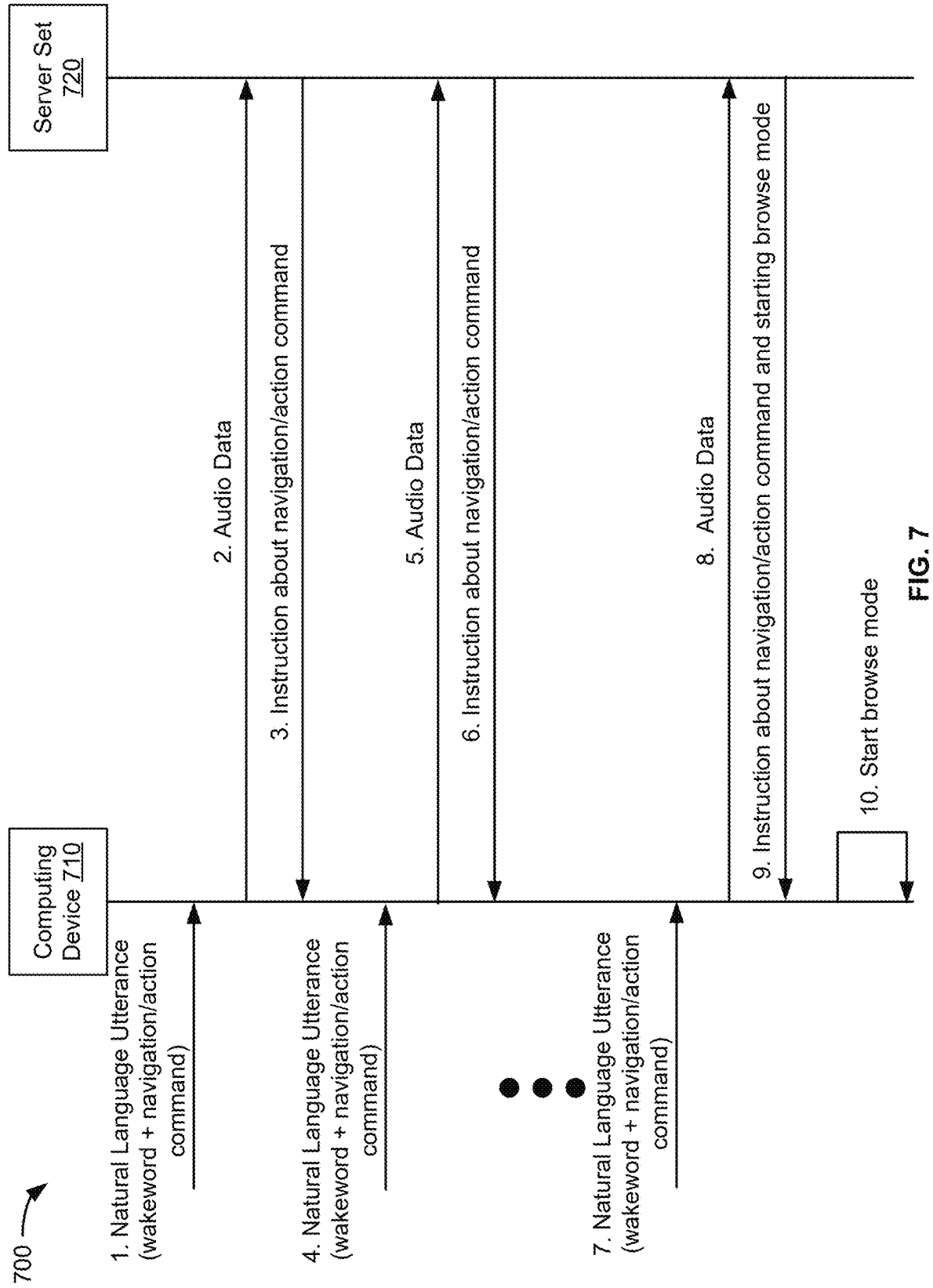
FIG. 7 illustrates an example of a sequence diagram between a computing device and a server set to support predictive voice-based interactions with the computing device, according to at least one embodiment.

FIG. 7 illustrates an example of a sequence diagram 700 between a computing device 710 and a server set 720 to support predictive voice-based interactions with the computing device, according to at least one embodiment. The computing device 710 and the server set 720 are examples of the computing device 610 and the server set 630, respectively, of FIG. 6. The sequence diagram 700 is illustrated with a predictive trigger detection at the server set 720 for a browse mode of the computing device 710. However, and as described herein above, the predictive trigger detection can be performed locally at the computing device 710 and/or can relate to another operational mode of the computing device 710, such as a follow-up mode.

Generally, the computing device 710 and the server set 720 can exchange communications when the computing device 710 is not in the browse mode and the communications can predictively trigger the browse mode. In comparison, when the computing device 710 is in the browse mode, the computing device 710 can locally process audio data and need not communicate with the server set 720 to support the processing, with the exception that the audio data can be sent to the server set 720 when the local processing results in no match with any browse commands.

As illustrated, in a first step of the sequence diagram 700, the computing device 710 receives a natural language utterance of a user. For example, a microphone of the computing device 710 detects the natural language utterance and generates audio data. The natural language utterance includes a wakeword followed by a requested navigation and/or action command (e.g., "Alexa, scroll down" or "Alexa, download the app"). The audio data corresponds to the wakeword and the requested navigation command and/or action command. The computing device 710 also performs wakeword detection on the audio data. For example, the audio data is input to a language model and this language model is trained to detect the wakeword.

In a second step of the sequence diagram 700, the computing device 710, upon detection of the wakeword and not being in the browse mode, sends the audio data (or at least the portion corresponding to the requested navigation and/or action command) to the server set 720. That is the case because the computing device 710 is not in the browse mode and further processing of the audio data is to be performed at the server set 720, until the computing device 710 is in the browse mode.

In a third step of the sequence diagram 700, the server set 720 sends an instruction to the computing device 710 about the requested navigation and/or action command. For example, the server set 720 performs ASR and NLU operations on the audio data and determines that an intent of the user is to perform the requested command (e.g., to scroll down or to download an application) and sends the instruction as a directive to the computing device 710.

In a fourth step of the sequence diagram 700, the computing device 710 receives another natural language utterance of the user. The natural language utterance can also include the wakeword and a requested command that relates to the same functionalities requested under the first step (e.g., can be a navigation command and/or an action command, such as "Alexa, scroll left" or "Alexa, open app page"). The computing device 710 also performs wakeword detection on audio data corresponding to this natural language utterance.

In a fifth step of the sequence diagram 700, the computing device 710, upon detection of the wakeword and not being in the browse mode, sends the audio data (or at least the portion corresponding to the requested command) to the server set 720. That is the case because the computing device 710 is still not in the browse mode and further processing of the audio data is to be performed at the server set 720.

In a sixth step of the sequence diagram 700, the server set 720 sends an instruction to the computing device 710 about the requested command. For example, the server set 720 performs ASR and NLU operations on the audio data and determines that an intent of the user is to perform the requested command (e.g., to scroll left or to open a page about the application) and sends the instruction as a directive to the computing device 710.

The processing of subsequent natural language utterances that include the wakeword can be repeated, as illustrated in a seventh step and eighth step of the sequence diagram 700. Thus, over time, the server set 720 can collect text data indicative of the natural language utterances (or, similarly, can collect the detected commands that have been requested) and detect a predictive trigger to start the browse mode. In particular, the collected data (e.g., text data and/or the detected commands) are input to a predictive model (e.g., the predictive model 634 of FIG. 6, where the input can be values for variables of if statements for an if-then model or can be data vectors for an AI model) that outputs a prediction that at least one subsequent natural language utterance is expected to be received within a time period from a start of the browse mode. Accordingly, in a ninth step of the sequence diagram 700, the server set 720 sends, to the computing device 710, an instruction about the command that was requested at the seventh step and an instruction to start the browse mode.

In a tenth step of the sequence diagram 700, the computing device 710 starts the browse mode. For example, the computing device 710 starts buffering audio data generated by the microphone (including data corresponding to natural language utterances, pauses, and noises) for ASR and NLU processing by an NLP engine (e.g., the NLP engine 214 of FIG. 2), starts a timer indicating lengths of time of pauses or noises, and presents an indicator of the browse mode (e.g., the browse mode indicator 112 of FIG. 1) on a display.

The sequence diagram 700 can include a different number of steps to support the predictive browse functionalities described in the present disclosure. For example, the predictive trigger can be determined at the third step, sixth step, or a subsequent step of the sequence diagram 700.

Figure 8:
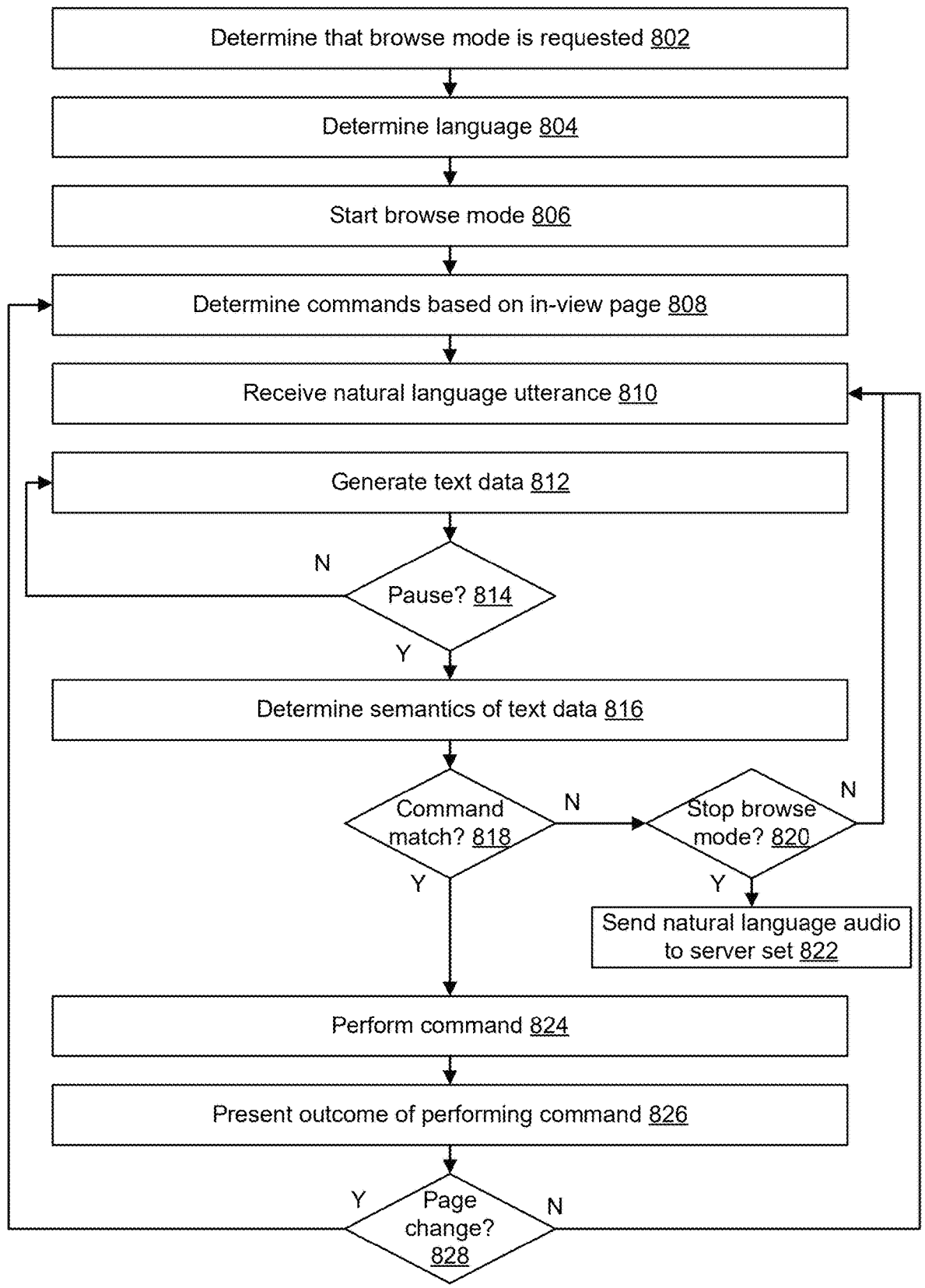
FIG. 8 illustrates an example of a flow for providing voice-based interactions with a computing device communicatively coupled with a display, according to at least one embodiment.
Figure 9:
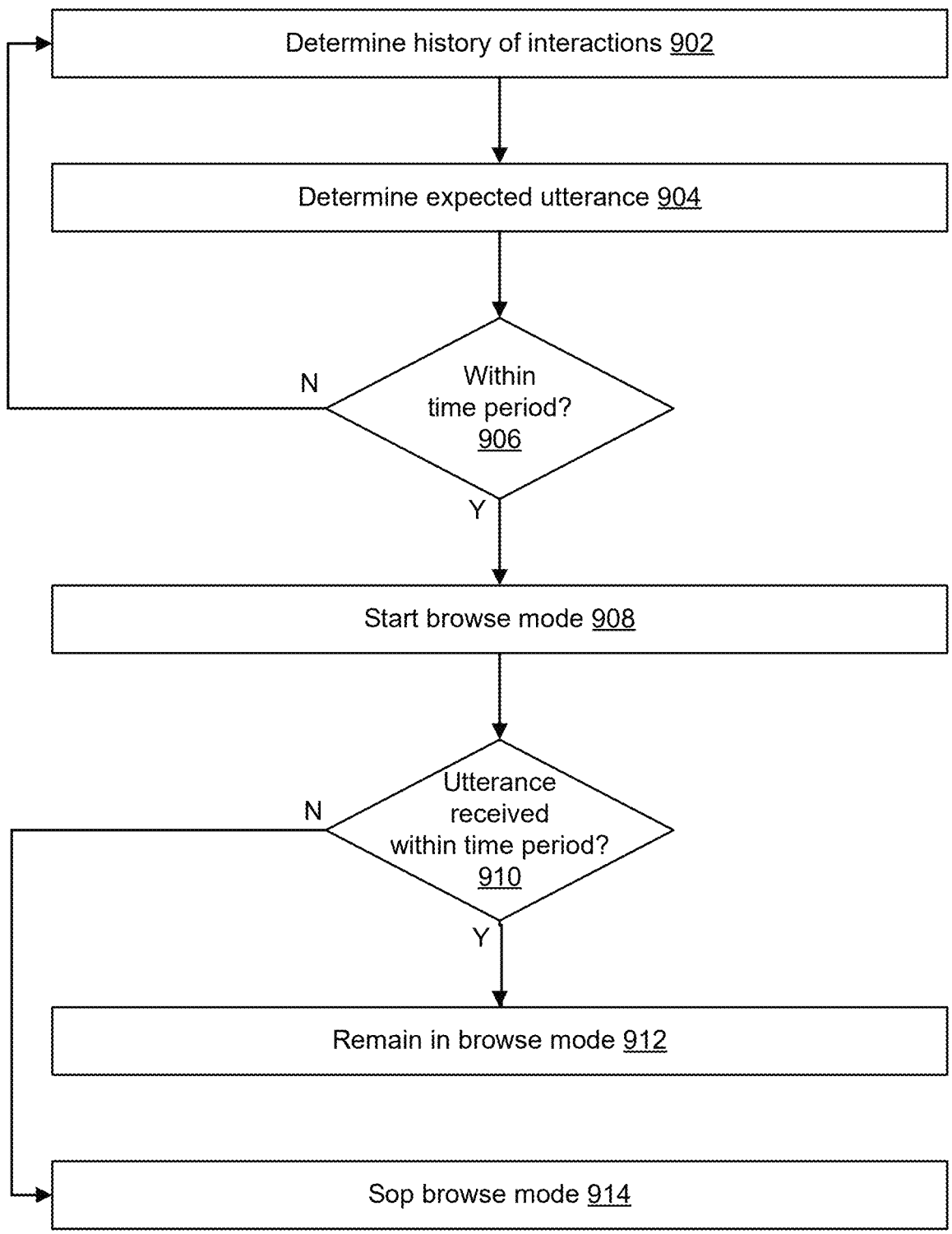
FIG. 9 illustrates an example of a flow for providing predictive voice-based interactions with a computing device communicatively coupled with a display, according to at least one embodiment.

FIGS. 8-9 illustrate example flows for using an operational mode on a computing device. The operational mode is described as a browse mode. Nonetheless, the flows can be similarly performed in connection with using other operational modes, such as a follow-up mode. The computing device can be any of the computing devices described herein above. Some or all of the instructions for performing the operations of flows can be implemented as hardware circuitry and/or stored as computer-readable instructions on a non-transitory computer-readable medium of the computing device. As implemented, the instructions represent modules that include circuitry or code executable by a processor(s) of the computing device. The use of such instructions configures the computing device to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow for providing voice-based interactions with the computing device communicatively coupled with a display, according to at least one embodiment. In an example, the flow starts at operation 802, where the computing device determines that the browse mode is requested. For instance, the computing device presents a menu on a display. A microphone of the computing device receives first audio corresponding to a wakeword and a first natural language utterance. The first natural language utterance indicates a request for interacting with the menu (e.g., a browse request or a request for the browse mode). Upon detecting the wakeword, the computing device sends, to a set of servers, second audio data corresponding to the first natural language utterance. In response, the computing device receives, from the set of servers, instruction data about starting an operational mode of the device, such as a browse mode, where this mode restricts voice-based interactions that are (i) with the menu, (ii) received at the microphone during a time period, and (iii) do not use the wakeword. The menu commands are defined in a language model that is stored on the device.

At operation 804, the computing device determines a language to be used in the browse mode. For example, the language is identified from a language setting or is detected by an AI model based on a set of previously received natural language utterances. The computing device sets a language to be used by a language model to the determined language.

At operation 806, the computing device starts the browse mode. For example, the computing device presents an indicator of the browse mode, starts a timer, and continuously receives audio data, and therefrom generates text data. The text data can be generated by the language model by performing an ASR process on the received audio data.

At operation 808, the computing device determines commands based on an in-view page. For example, the language model stores definitions of commands that are static, such as in-page and out-page navigation commands. These commands are added to a set of available commands. In addition, some of the commands can dynamically change depending on the page that is presented (e.g., the in-view page). This page can include selectable actions. An action command can be defined by the language model for each of the selectable actions. Based on the presented page and associations between the actions selectable therefrom and the action commands, the language model adds the associated action commands to the set of available commands.

At operation 810, the computing device receives a natural language utterance. For example, the microphone receives audio data corresponding to the natural language utterance. This natural language data may not include the wakeword and may still be processed because the computing device is in the browse mode.

At operation 812, the computing device generates, from the audio data, text data that corresponds to the natural language utterance. For example, the ASR process is applied to the audio data to generate the text data according to the language set in the language model.

At operation 814, the computing device determines whether a pause (including, for instance, noise data but not utterance data) is detected in the audio data. If no pause is detected, the flow loops back to operation 812 where the computing device continues generating the text data. If a pause is detected (e.g., by the strength of the audio signal falling below a predefined threshold strength for a predefined length of time), the flow may proceed to operation 816.

At operation 816, the computing device determines semantics of the text data. For example, the language model performs an NLU process on the text data to determine the semantics.

At operation 818, the computing device determines whether the semantics of the text data correspond to a command of the browse mode (e.g., a menu command, such as one of the available commands from the set determined at operation 808). If the semantics do not match (e.g., text match, intent match, or classification match) any of the available commands, operation 820 follows operation 818. Otherwise, the flow proceeds to operation 824.

At operation 820, the computing device determines whether to stop the browse mode.

For example, the computing device presents a notification (e.g., on the display or via a speaker) that the requested command is not supported and requests a confirmation whether the browse mode is to be stopped. If the confirmation is received (e.g., via a peripheral device or via another natural language utterance that may not include the wakeword and that is processed locally on the computing device per operations 810-816), the computing device can stop the browse mode.

Additionally, operation 822 may follow operation 820. Otherwise, the flow loops back to operation 810, resetting the timer to further receive and process a next natural language utterance.

At operation 822, the computing device can send, to the set of servers, the audio data (or the corresponding text data) that was processed but not matched with an available command. In this way, the set of servers can further process this audio data (or the corresponding text data) and send an instruction back to the computing device.

At operation 824, the computing device performs the command that was matched at operation 818. For instance, if this command is a navigation command, the menu is navigated according to this command. If this command is an action command for an action available from the menu, the action is initiated.

At operation 826, the computing device presents an outcome of performing the command. For instance, a command indicator is presented on the display.

At operation 828, the computing device determines whether a page change has occurred. For instance, performing the command can result in a different page becoming in view on the display. If so, the flow loops pack to operation 808 to update the set of available commands to include the action commands associated with the different page. Otherwise, the flow loops back to operation 810 to process a next natural language utterance.

Of course, at different points of the flow, the browse mode can be stopped. For instance, upon receiving input from an input peripheral device (e.g., from a remote controller), the computing device stops the browse mode. Additionally or alternatively, when an action is performed and results in dismissing the menu from the display (e.g., the streaming of a movie title starts), the browse mode can be stopped. Upon receiving and processing a natural language utterance (e.g., per operations 810-818) and determining that its semantics correspond to an explicit request to stop the browse mode, the browse mode is stopped. In yet another illustration, the computing device can detect a pause, then compare the time length of the pause to the length of the time period during which the browse mode is to be maintained. If the pause length is shorter, the execution of the flow continues and the timer is reset. Otherwise, the computing device determines that the browse mode is to be stopped and accordingly stops the browse mode.

FIG. 9 illustrates an example of a flow for providing predictive voice-based interactions with the computing device communicatively coupled with the display, according to at least one embodiment. In an example, the flow starts at operation 902, where the computing device determines a history of interactions. For instance, the interactions can include user interactions via an input peripheral device and/or voice-based interactions (e.g., previous natural language utterances that are processed via the set of servers). The tracking of the interactions (e.g., including any input data, audio data, text data, and/or determined user requests) can be performed locally on the computing device (e.g., via a predictive model) or remotely on the set of the servers (e.g., also via a predictive model).

At operation 904, the computing device determines that a natural language utterance is expected based on the history of interactions. For example, data about the history is input into the predictive model (at the computing device or the set of servers) and a pattern is determined. The pattern indicates a likelihood that the natural language utterance will be received within an expected time period.

At operation 906, the computing device determines whether the expected time period is shorter than a length of the time period of the browse mode. Being shorter indicates that the natural language utterance would be received while the browse mode is in effect, if the browse mode was started. Otherwise, the natural language utterance may be received but at some point in time after the browse mode would have been stopped, if the browse mode was started. Accordingly, if shorter than the length of time, operation 908 can follow operation 906. Otherwise, the flow loops back to operation 902 to continue tracking the history of interactions.

At operation 908, the computing device starts the browse mode. For instance, the computing device starts the timer, continuously processes any audio data generated by the microphone to generate text data as applicable, and continuously looks for a pause in the audio data.

At operation 910, the computing device determines whether a natural language utterance is received within the time period of the browse mode. For instance, if the audio data includes the natural language utterance and is received before the timer expires, operation 912 can follow operation 910. Otherwise, the audio corresponds to noise and/or a long pause, and the flow proceeds to operation 914.

At operation 912, the computing device remains in the browse mode. For instance, the text data generated from the audio data is processed through an NLU process to determine its semantics for further processing at the computing device (e.g., to determine a command match) or remotely at the set of server (e.g., in case of no command match).

At operation 914, the computing device stops the browse mode. For instance, the computing device stops its continuous processing of the audio data to generate text data and determine its semantics and no longer restricts the functionalities to the ones of the browse mode. Instead, the computing device starts processing audio data for wakeword detection.

Figure 10:
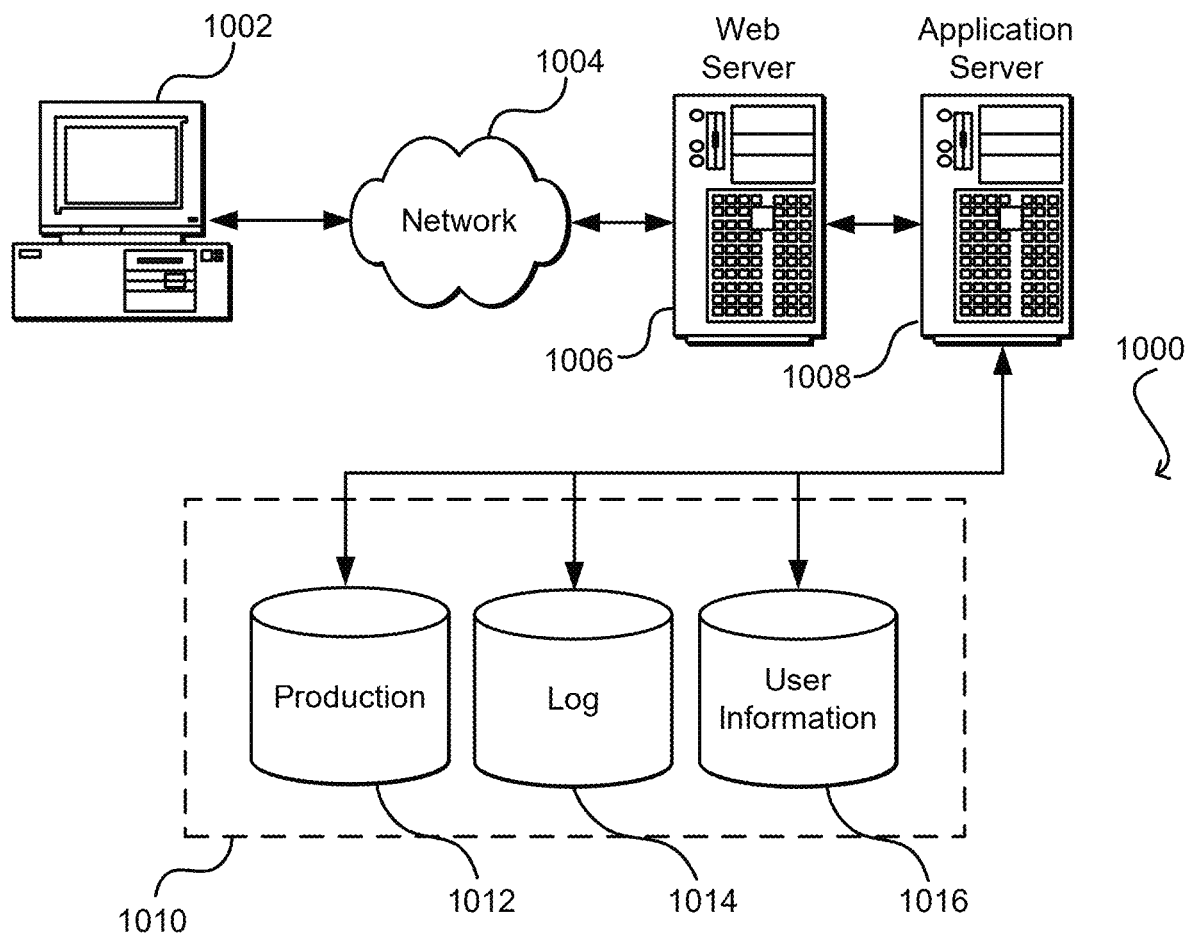
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device comprising:
   a microphone;
   a processor; and
   a memory storing instructions that, upon execution by the processor, configure the device to:
      present content on a display;
      detect, by at least using the microphone, a natural language input requesting an operation associated with at least a portion of the content;
      generate data that represents the natural language input;
      generate an input to a language model based at least in part on the data and whether the content is in view or out of view;
      determine, based at least in part on the input, an output of the language model, wherein the output indicates a command to perform and is based at least in part on the data and whether the content is in view or out of view; and
      present, on the display, an outcome of performing the command.

2. The device of claim 1, wherein the content is first content that is in view on the display, and wherein the language model is configured to indicate the command based at least in part on the first content being in view and independently of second content that is out of view.

3. The device of claim 1, wherein the language model is configured to indicate the command based at least in part on the content and a natural language understanding of the data.

4. The device of claim 1, wherein the language model is trained across multiple spoken languages such that the language model is capable of indicating the command based at least in part on the content and a natural language understanding of the data in at least one of the multiple spoken languages.

5. The device of claim 1, wherein the content, the natural language input, and the command are first content, a first natural language input, and a first command, respectively, and wherein the memory stores further instructions that, upon execution by the processor, configure the device to:
   present second content on the display, wherein a presentation of the second content replaces a presentation of the first content on the display;
   detect a second natural language input requesting the operation; and
   determine, by using the language model based at least in part on the second content and the second natural language input, a second command to perform, wherein the second command is different from the first command, and wherein the language model is configured to indicate the second command instead of the first command based at least in part on the presentation of the first content being replaced by the presentation of the second content.

6. The device of claim 1, wherein the content, the natural language input, and the command are first content, a first natural language input, and a first command, respectively, and wherein the memory stores further instructions that, upon execution by the processor, configure the device to:
   present second content on the display, wherein a presentation of the second content replaces a presentation of the first content on the display;
   detect a second natural language input requesting the operation or another operation; and
   determine, by using the language model based at least in part on the second content and the second natural language input, a second command to perform, wherein the second command becomes available while the first command becomes unavailable based at least in part on the presentation of the first content being replaced by the presentation of the second content.

7. The device of claim 1, wherein the natural language input is a first natural language input, and wherein the memory stores further instructions that, upon execution by the processor, configure the device:
   determine a second natural language input;
   determine, by using the language model, that the second natural language input is unassociated with the content; and
   cause another operation to be performed based at least in part on the second natural language input being unassociated with the content.

8. The device of claim 1, wherein the portion is a first portion that is in view and associated with a first selectable action, and wherein the language model is configured to indicate the first selectable action as the command based at least in part on the first portion being in view.

9. The device of claim 1, wherein the content includes a second portion that is out of view and associated with a second selectable action, and wherein the language model is configured to exclude an indication of the second selectable action from the command based at least in part on the second portion being out of view.

10. The device of claim 1, wherein the memory stores the language model and further instructions that, upon execution by the processor, configure the device to:
    start an operational mode of the device, wherein the operational mode restricts voice-based interactions with the device to a set of commands supported by the language model, wherein the input is generated based at least in part on the device operating in the operational mode.

11. The device of claim 10, wherein the memory stores additional instructions that, upon execution by the processor, configure the device to:
    prior to starting the operational mode, determine that a voice-based interaction with the device is expected during a time period, wherein the operational mode is started based at least in part on the voice-based interaction being expected, and wherein the natural language input is the voice-based interaction and is received during the time period; and present, on the display, an indication of the operational mode.

12. A method implemented by a device, the method comprising:

presenting content on a display;

determining a natural language input requesting an operation associated with at least a portion of the content;

generating an input to a language model based at least in part on the natural language input and whether the content is in view or out of view;

determining, based at least in part on the input, an output of the language model, wherein the output indicates a command to perform and is based at least in part on the natural language input and whether the content is in view or out of view; and presenting, on the display, an outcome of performing the command.

13. The method of claim 12, further comprising:

starting an operational mode of the device, the operational mode restricting natural language inputs to the device to a set of commands supported by the language model, wherein the input is generated based at least in part on the device operating in the operational mode.

14. The method of claim 13, wherein the natural language input is a first natural language input, and further comprising:

determining a second natural language input;

determining, by using the language model, that the second natural language input is unassociated with the content; and exiting the operational mode based at least in part on the second natural language input being unassociated with the content.

15. The method of claim 12, further comprising:

determining a pause subsequent to the natural language input, wherein data is generated while the natural language input is determined and represents the natural language input, and wherein the input is provided to the language model based at least in part on the data and the pause.

16. One or more non-transitory computer-readable storage media storing instructions that, upon execution on a device, cause the device to perform operations comprising:

presenting content on a display;

determining a natural language input requesting an operation associated with at least a portion of the content;

generating an input to a language model based at least in part on the natural language input and whether the content is in view or out of view;

determining, based at least in part on the input, an output of the language model, wherein the output indicates a command to perform and is based at least in part on the natural language input and whether the content is in view or out of view; and presenting, on the display, an outcome of performing the command.

17. The one or more non-transitory computer-readable storage media of claim 16, wherein the language model comprises an artificial intelligence model trained on navigations within a content page, navigations between different content pages, and action commands.

18. The one or more non-transitory computer-readable storage media of claim 16, wherein the operations further comprise:

starting an operational mode of the device, the operational mode restricting processing of natural language inputs to using the language model for the processing, wherein the input is generated based at least in part on the device operating in the operational mode.

19. The one or more non-transitory computer-readable storage media of claim 16, wherein the portion is a first portion that is in view and associated a first selectable action, and wherein the command indicates the first selectable action based at least in part on the first portion being in view.

20. The one or more non-transitory computer-readable storage media of claim 16, wherein the operations further comprise:

presenting a menu page on the display, wherein the content being in view corresponds to being included in the menu page and user visible, wherein the content being out view corresponds to being included in the menu page and not user visible, wherein the command includes a menu navigational command if the content is in view, and wherein the command includes a different menu navigational command if the content is out of view.

* * * * *